United States Patent
Koch

[15] 3,675,880
[45] July 11, 1972

[54] MODULAR AIRCRAFT PEDESTAL

[72] Inventor: John H. Koch, Acton, Mass.

[73] Assignee: Atkins & Merrill, Inc., Marlboro, Mass.

[22] Filed: Dec. 11, 1970

[21] Appl. No.: 97,073

[52] U.S. Cl. ........................................................244/83 R
[51] Int. Cl. ......................................................B64c 13/04
[58] Field of Search..............244/83 R, 84, 75; 74/479, 480, 74/491

[56] References Cited

UNITED STATES PATENTS

| | | | |
|---|---|---|---|
| 3,041,018 | 6/1962 | Smith | 244/83 R |
| 3,599,510 | 8/1971 | Scott, Sr. et al. | 244/83 R |

Primary Examiner—Milton Buchler
Assistant Examiner—Carl A. Rutledge
Attorney—Schiller & Pandiscio

[57] ABSTRACT

A standardized aircraft flight and engine control assembly in modular form adapted to be incorporated in an aircraft pilots' control pedestal in place of or in addition to the actual aircraft parts. The assembly is made up of one or more control modules including levers for controlling devices such as flaps, spoilers, brakes, elevator trim, and the like, mounted in spaced relation on a chassis designed to fit within a control pedestal. The chassis includes means for holding and supporting an engine control module comprising a support and a plurality of similar engine control lever assemblies mounted on the support in side-by-side relation. The support is designed to hold a variable number of control lever assemblies, one for each engine, so that the dimensions of the overall assembly can be standardized, yet the component modules varied in number and function as required for different aircraft.

7 Claims, 5 Drawing Figures

JOHN H. KOCH
INVENTOR.
BY
Schiller & Pandiscio
ATTORNEYS.

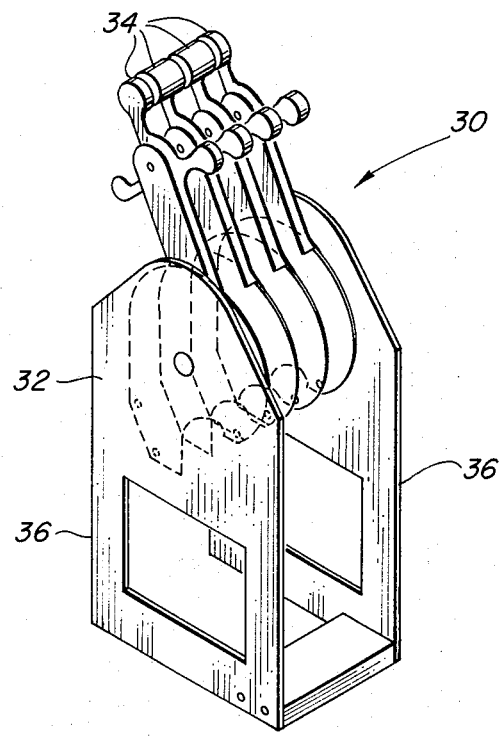
FIG. 3.
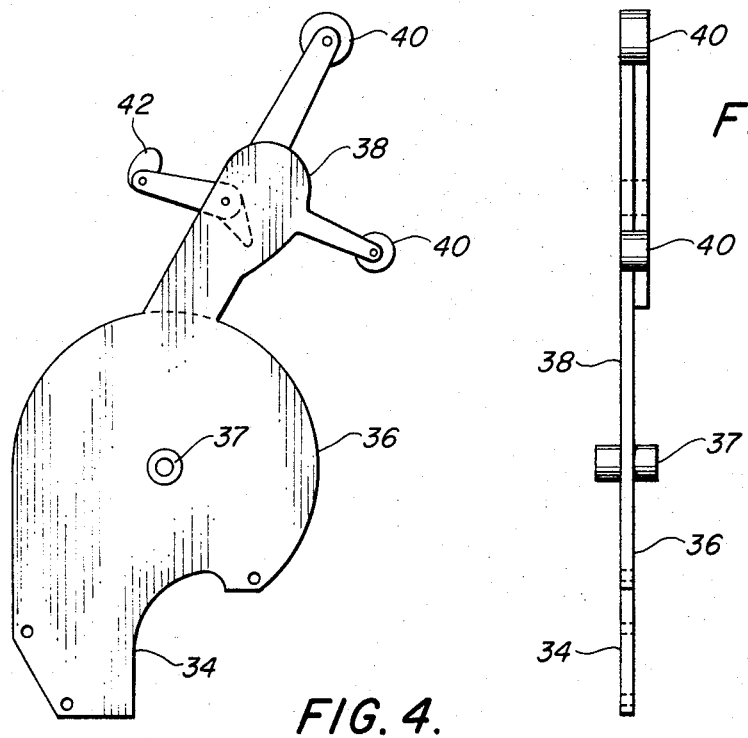
FIG. 5
FIG. 4.
JOHN H. KOCH
INVENTOR.
BY
Schitter & Pandiscio
ATTORNEYS.

MODULAR AIRCRAFT PEDESTAL

This invention relates to aircraft cockpit controls and particularly to an improved aircraft pilots' control stand or pedestal.

Conventional aircraft cockpits are equipped with a center pedestal or stand located between the pilot and co-pilot stations and including controls required to be readily accessible to both pilots. These include flight controls such as flaps, slats, stabilizer and rudder trims, spoilers, brakes, and the like; engine controls including power or throttle and thrust control levers; and radio navigation and communication equipment. Heretofore, it has been the practice for each airframe manufacturer to build the pedestal for each type and model of aircraft. Thus, although most pedestals maybe basically the same with regard to their functions and include the controls for the same systems, each pedestal is unique to the particular manufacturer and aircraft and the structures of different pedestals, aside from superficial similarities, maybe basically different.

The number of different control pedestal desigs and constructions is very substantial in view of the number of different aircraft manufactures and models of aircraft. However, the actual number of each particular pedestal built may be relatively small, i.e., in the hundreds, even though the pedestal is incorporated in each aircraft as well as in corresponding trainers and flight simulators, so that the cost of an individual pedestal is very substantial. The cost is so substantial, appreciable savings could be realized if it were no longer necessary for each airframe and trainer manufacturer to design and construct a different pedestal for each particular aircraft, flight simulator, cockpit procedure trainer, and the like.

An object of the present invention is to provide a standardized flight and engine control module designed to fit within the pilots' control pedestal confines of most aircraft regardless of manufacturer, type or model of aircraft or number of engines.

Another object of the invention is to provide a standardized flight and engine control module designed to permit variations in the controls as necessary to meet a particular aircraft or aircraft manufacturer's requirements.

A further object of the invention is to provide an engine control assembly made up of standardized, interchangeable engine control lever modules and a support adapted to hold a variable number of the control lever modules.

Other objects of the invention will in part be obvious and will in part appear hereinafter.

The invention accordingly comprises the apparatus possessing the construction, combination of elements and arrangement of parts which are exemplified in the following detailed disclosure and the scope of the application of which will be indicated in the claims.

For a fuller understanding of the nature and objects of the invention, reference should be had to the following detailed description taken in connection with the accompanying drawings wherein:

FIG. 3 is a perspective view of an assembly of engine control lever assemblies in modular form; and FIG. 4 is a side elevation view of an engine control lever assembly; and FIG. 5 is a front elevation view of the lever assembly of FIG. 4.

Figure 1:
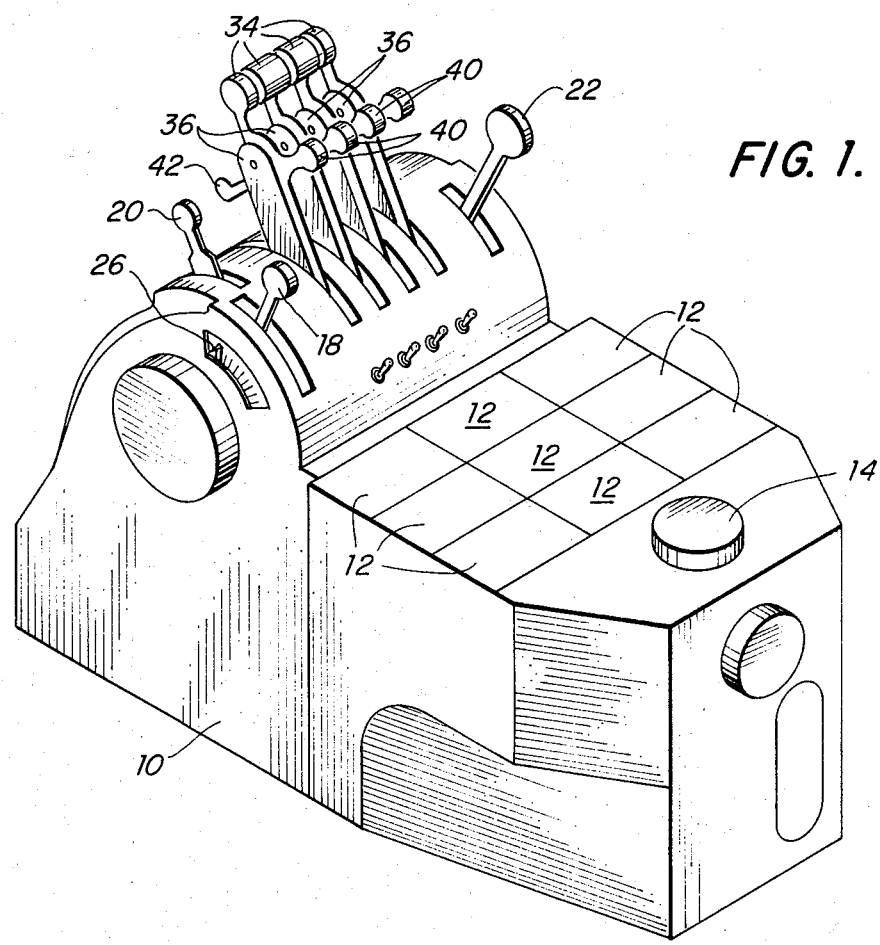
FIG. 1 is a perspective view of a typical aircraft pilots' flight and engine control pedestal embodying the invention.

Reference is now made to FIG. 1 of the drawings wherein there is illustrated a typical pilots' control stand including flight and engine controls, radio navigational and communications equipment. The control stand includes a housing, generally designated 10, for mounting and enclosing the controls and radio equipment. The radio navigation and communication units are shown diagramatically at 12 and are mounted within recesses provided in housing 10. A typical rudder trim control knob 14 is shown located at the top rear of the control stand housing.

Figure 2:
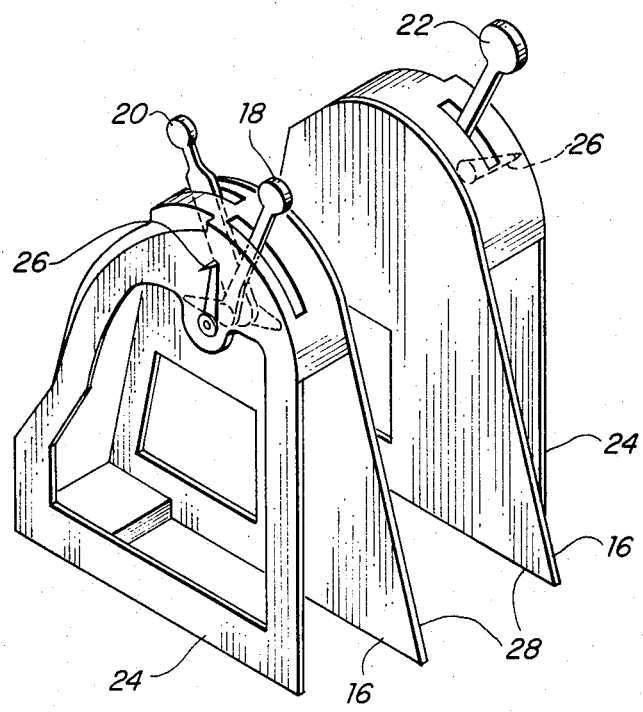
FIG. 2 is a perspective view of standardized control assembly modules incorporated in the pedestal of FIG. 1.

The flight and engine control assembly of the invention is located in the forward section of the pedestal housing and, as shown in FIG. 2, comprises a chassis 16 designed to fit within the housing while operatively supporting the flight and engine controls. The flight controls typically include levers, wheels, knobs, and the like for controlling flight control elements such as flaps, slats, spoilers, brakes, stabilizer trim and the like.

In the assembly shown by way of example, the flight controls include a flight control module comprising levers 18 and 20 located on the left (facing forward) for controlling, respectively, the stabilizer trim and speed brakes; another module including lever 22 (or levers) is located on the right for controlling the flaps (and/or spoilers and slats). Chassis 16 includes outer side members 24 on which are mounted indicators 26 visible to both pilots, showing stabilizer position.

Chassis 16 also includes inner side walls 28 defining therebetween a recess for holding and supporting an engine control lever module designated 30 shown in FIG. 3. The engine control lever module 30 includes a support or chassis 32 designed to support a variable number of engine control assemblies 34 such as shown in FIG. 4, the number being dependent upon the number of engines. Support 32 includes side members 36 adapted to fit between inner side members 28 of chassis 16, and a shaft (not shown) extending between side members 26 coaxially mounting lever assemblies 24. To enable a chassis 32 to operatively support a variable number of engine control lever assemblies 34, it is constructed to accommodate a maximum number such as four, and spaces or sizers are provided in the event fewer lever assemblies are required.

Each engine control lever assembly 34 as shown in FIGS. 4 and 5 is in the form of a flat wafer or pancake at its lower end, and at its upper end it is shaped to fit and look like a specific type of lever made by a given manufacturer. The lever assembly includes a center pivot point for forward and rearward rotational movement about a bushing 35 and includes one or more extensions 38 to which are attached knobs 40. The length and direction of the extensions and the design of the knobs may be varied to suit a particular manufacturer although the basic lever assemblies are interchangable. The lever assembly illustrated also includes a thrust reversal lever 42 pivotly mounted on the power control lever 36. The control levers 36 are similarly constructed, arranged and coupled with the engines such that the levers and knobs will be aligned when the respective control settings for all the engines are substantially the same. The levers and knobs are also arranged to facilitate their being grasped and moved simultaneously with one hand.

Each engine control lever assembly 34 as shown in FIG. 3 will also incorporate other mechanical and electrical components such as switches, detents, linkages, shafts, and the like for controlling and/or coupling the control levers to various systems, indicating lever positions and/or system settings and coupling the levers to one another so that their functions are coordinated. The functions, constructions, and operation of these additional components are considered to be so standardized and well known in the art as not to require more detailed description.

It will be seen from the foregoing that each flight and engine control assembly incorporates the basic components required for operating the various systems of most aircraft. Each assembly is composed of sub-assemblies in the form of standardized, interchangable modules which can be incorporated (or omitted) as required for a particular aircraft. Each sub-assmbly or module incorporates the basic levers and controls while permitting superficial design changes, particularly in the external components such as knobs, lever positions, and the like. A predetermined number of engine control lever assemblies can be easily and rapidly assembled together in a chassis to provide the functional requirements for a particular aircraft. A particular airframe manufacturer's model can be duplicated by providing knobs having the requisite distinctive features such as size, shape and color and by mounting the assembled modules in their chassis in an external housing of the manufacturer's distinctive or particular design.

Since certain changes may be made in the above apparatus without departing from the scope of the invention herein involved, it is intended that all matter contained in the above description (or shown in the accompanying drawings) shall be interpreted as illustrative and not in a limiting sense.

What is claimed is:

1. A modular aircraft flight and engine control assembly for incorporation in an aircraft pilots' control stand, said assembly comprising, in combination:

an engine control module comprising a plurality of manually operable control lever assemblies, each including a plurality of levers for controlling the functions of an engine including the power output thereof;

a module support for mounting said lever assemblies in side-by-side relation;

a pair of flight control modules each comprising a manually operable lever assembly for varying the position of at least one aircraft flight control element; and a chassis designed to fit within an aircraft pilots' control stand for supporting said flight control modules in spaced apart relation and including means for supporting said engine control module between said flight control modules.

2. An aircraft control assembly as defined in claim 1 wherein all of said control lever assemblies include levers for performing the same engine control functions, each for a single engine, and have substantially the same dimensions and configurations.

3. An aircraft control assembly as defined in claim 2 wherein said module support in constructed to support a variable number of said engine control lever assemblies in side-by-side relation.

4. An aircraft control assembly as defined in claim 3 wherein said module support is constructed to locate said levers for performing the same control function, in alignment when adjusted for the same control setting.

5. An aircraft control assembly as defined in claim 2 wherein each of said control lever assemblies includes a support member for mounting said levers and other components for controlling the operation of an engine and said support members are substantially identical.

6. An aircraft control assembly as defined in claim 1 wherein each of said engine control lever assemblies includes levers for controlling at least the power output and thrust direction of an engine.

7. An aircraft control assembly as defined in claim 1 wherein said chassis includes means providing a recess for containing and mounting said engine control module and is adapted to be inserted into and contained within a recess in a pilots' control stand.

* * * * *